United States Patent [19]

Inomata et al.

[11] 3,929,914
[45] Dec. 30, 1975

[54] PROCESS FOR PREPARING A POLYCARBOXYDIENE POLYMER

[75] Inventors: Jihei Inomata, Komae; Seiichi Hino; Tatsuo Tani, both of Yokohama, all of Japan

[73] Assignee: Mitsubishi Chemical Industries, Ltd., Tokyo, Japan

[22] Filed: Apr. 1, 1974

[21] Appl. No.: 456,654

Related U.S. Application Data

[63] Continuation-in-part of Ser. No. 276,788, July 31, 1972.

[52] U.S. Cl. .................. 260/635 E; 260/78.4 EP; 260/78.4 D; 260/85.1; 260/83.5; 260/82.1; 260/94.7 A; 260/94.7 HA
[51] Int. Cl.² ................... C08D 5/02; C08D 1/20
[58] Field of Search ........... 260/94.7 A, 94.7 HA, 78.4 EP, 260/635 E, 78.4 D, 82.1, 85.1, 83.5

[56] References Cited
UNITED STATES PATENTS

| | | | |
|---|---|---|---|
| 3,609,111 | 9/1971 | Kumanatoni | 260/78.4 D X |
| 3,652,520 | 3/1972 | Ryan et al. | 260/94.7 A X |
| 3,661,840 | 5/1972 | Deutsch | 260/94.7 N X |
| 3,705,866 | 12/1972 | Shibata et al. | 260/78.4 D X |
| 3,804,923 | 4/1974 | Suzuki et al. | 260/94.7 A X |
| 3,842,146 | 10/1974 | Milkovich et al. | 260/94.7 A X |

*Primary Examiner*—William F. Hamrock
*Attorney, Agent, or Firm*—Oblon, Fisher, Spivak, McClelland & Maier

[57] ABSTRACT

A polycarboxydiene polymer is prepared by reacting a saturated polycarboxylic acid, anhydride, ester or acid halide with a polyhydroxydiene polymer having pendant and terminal hydroxy groups obtained from the reaction of 1 mole of a living polymer having a molecular weight of 500 to 10,000 which is prepared by reacting a conjugated diolefin or a mixture of the conjugated diolefin and a vinyl compound having the formula:

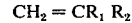

wherein $R_1$ represents a hydrogen atom or an alkyl group and $R_2$ represents an aryl group or a pyridyl group in the presence of sodium or lithium metal or an organo sodium or lithium compound with 0.5 mole to 2 moles of epichlorohydrin, epibromohydrin, epifluorohydrin, chlorobutylene oxide or bromobutylene oxide.

6 Claims, No Drawings

3,929,914

PROCESS FOR PREPARING A POLYCARBOXYDIENE POLYMER

CROSS REFERENCE TO RELATED APPLICATIONS

This application is a continuation-in-part of application Ser. No. 276,788 filed July 31, 1972.

BACKGROUND OF THE INVENTION

1. Field of the Invention

The present invention relates to a process for producing a reactive liquid conjugated diene polymer. More particularly, the invention relates to a process of producing a polycarboxydiene polymer from a conjugated diene polymer.

2. Description of the Prior Art

Various processes for producing conjugated diene polymers containing reactive groups such as epoxy, hydroxyl, etc., are well known to those skilled in the art. For instance, processes such as the reaction between a large excess of epichlorohydrin and a living polymer such as polybutadiene, and the reaction of a polyepoxide such as limonene diepoxide with living polybutadiene are well known. However, deficiencies are inherent in the products of both reactions. The polymers prepared by the former process have reactive groups only at the terminals of the polymer, which result in a polymer difficult to cure. The polymers prepared by the latter process can be cured, but the cured polymers are much too brittle. Therefore, these products have not been of much commercial value.

SUMMARY OF THE INVENTION

Accordingly, it is an object of this invention to provide a process for producing a conjugated diene polymer containing pendant reactive moieties such as an hydroxyl group, a carboxyl group or a polymerizable unsaturated bond in the polymer chain.

It is another object of this invention to provide a process for producing a liquid conjugated diene polymer which is easily processed.

Yet another object of this invention is to provide a process for producing a polycarboxydiene polymer which is easily cured from a liquid conjugated diene polymer.

Still another object of this invention is to provide a process for preparing a conjugated diene polymer useful in various applications such as electric insulators, sealers, shock absorbers, etc.

Briefly, these objects and other objects of the present invention as hereinafter will become more readily apparent can be attained by a process for preparing a polycarboxydiene polymer by reacting a saturated polycarboxylic acid, anhydride, ester or acid halide with a polyhydroxydiene polymer having pendant and terminal hydroxy groups obtained from the reaction of 1 mole of a living polymer having a molecular weight of 500 to 10,000 which is prepared by reacting a conjugated diolefin or a mixture of the conjugated diolefin and a vinyl compound having the formula: $CH_2 = CR_1 R_2$, wherein $R_1$ represents a hydrogen atom or an alkyl group and $R_2$ represents an aryl group or a pyridyl group in the presence of sodium or lithium metal or an organo sodium or lithium compound with 0.5 mole to 2 moles of epichlorohydrin, epibromohydrin, epifluorohydrin, chlorobutylene oxide or bromobutylene oxide.

DESCRIPTION OF THE PREFERRED EMBODIMENTS

The living polymers used as the starting material in this invention are liquid polymers having an alkali metal at both ends of the polymer. The polymers are prepared by reacting an alkali metal or an organoalkali metal compound with a conjugated diolefin or a mixture of a conjugated diolefin and a vinyl compound and range in molecular weight from 500 to 10,000, and especially from 1,000 to 5,000. In order to prepare cured polymeric products having excellent low temperature characteristics, it is preferable to have a greater content of conjugated diolefin or diene units in the living conjugated diene polymer than vinyl units, and especially preferable to have 30% more diene units than vinyl units. The conjugated dienes, which are used as the monomer starting material of the liquid living polymer, can be butadiene-1,3; 2-methylbutadiene-1,3; pentadiene-1,3; 2,3-dimethylbutadiene-1,3; 1-phenylbutadiene-1,3, etc.

Vinyl compounds having the formula: $CH_2 = CR_1 R_2$ used in conjunction with a conjugated diene can be vinyl aromatic compounds such as styrene, α-methylstyrene, tert-butylstyrene, paramethoxystyrene and vinyltoluene; and vinyl pyridines such as 2-vinylpyridine and 4-vinylpyridine. The amount of the vinyl compound employed is dependent upon the physical characteristics desired in the cured product polymers and is usually less than 75 weight percent, preferably less than 50 weight percent and especially less than 25 weight percent based on the total monomer content of the product polymers.

The alkali metal used as the initiator in the process can be lithium, sodium, potassium, rubidium, cesium, etc. The organoalkali metal compound used as the initiator can be an alkali metal complex of naphthalene, anthracene and biphenyl; a complex of dienes, such as the dimer, trimer and tetramer lithium complex of butadiene and isoprene; a complex of styrene and a dialkali metal hydrocarbon compound such as 1,4-dialkali metal butane, 1,5-dialkali metal pentane, 1,10-dialkali metal decane, 1,2-dialkali metal-1,2-diphenylethane, 1,4-dialkali metal-1,1,4,4-tetraphenylbutane. When a liquid living conjugated diene polymer having a high content of diene units is desired, lithium metal or organolithium compounds such as the dimeric lithium complexes of butadiene or isoprene are preferably used.

The alkali metal complexes of conjugated dienes can be prepared by the following process. An alkali metal is reacted with a polycyclic aromatic compound at −20°~30°C., preferably 0°−25°C., in a diluent to form an alkali metal complex of the polycyclic aromatic compound. The polycyclic aromatic compound can be naphthalene, biphenyl, phenanthrene, anthracene, etc., and is usually employed in the diluent at concentrations ranging from 200 to 500 millimole per liter. The polycyclic aromatic compound-alkali metal adduct is filtered to remove unreacted alkali metal, and then is reacted with any one of said conjugated dienes. It is necessary to conduct the reaction at temperatures lower than 0°C. to prevent the formation of higher polymerization products of the conjugated diene. Preferably, the reaction is conducted at temperatures lower than −20°C. and as low as −78°C. Suitable diluents include aprotonic Lewis bases such as aliphatic ethers, alicyclic ethers, aliphatic polyethers, aromatic ring containing ethers and tertiary amines. Specific examples include dimethyl ether, methylethyl ether, diethyl ether, diisopropyl ether, tetrahydrofuran, dioxane, diethyleneglycol dimethyl ether, ethyleneglycol dimethyl ether, anisole, ethylphenyl ether, trimethylamine, triethylamine, dimethylaniline, etc. Economic advantages are realized when the diluents are mixed with a hydrocarbon such as hexane, heptane, benzene, toluene, xylene, cyclohexane, methylcyclohexane, etc.

Using the aforementioned process, an initiator solution can be prepared containing a dialkali metal complex of an oligomer which is principally a dimer of a conjugated diene. In the preparation of a liquid living polymer using the above initiator, the polymerization is enhanced by the addition of a hydrocarbon solvent such as hexane, heptane, benzene, toluene, xylene, cyclohexane, methylcyclohexane, etc. Preferably, the hydrocarbon solvent contains a Lewis base in order to more uniformly react them. These Lewis bases can be oxygen containing Lewis bases such as dimethyl ether, diethyl ether, diisopropl ether, tetrahydrofuran, dioxane, diethyleneglycol dimethyl ether, ethyleneglycol dimethyl ether, anisole and ethylphenyl ether; and nitrogen containing Lewis bases such as trimethylamine, triethylamine and dimethylaniline. However, the addition of a Lewis base to the solvent mixture causes a decrease in the content of diene units in the polymeric product. When a living polymer containing a high content of diene units is desired, the amount of Lewis base added to the reaction solution should be minimized.

The essential feature of this invention is the reaction of specific amounts of a haloalkyleneoxide with the liquid living polymers previously described. The haloalkyleneoxide compounds have the formula:

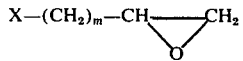

wherein X represents a halogen atom and m represents an integer greater than or equal to one. Suitable compounds include epichlorohydrin, epibromohydrin, epifluorohydrin, chlorobutylene oxide, bromobutylene oxide, etc. Preferably epichlorohydrin is employed. The amount of haloalkyleneoxide used in the reaction usually ranges from 0.5 mole to 2 moles and is preferably used in quantities from 0.6 to 1.7 moles per mole of liquid living polymer. When more than 2 moles of the haloalkyleneoxide is used per mole of liquid living polymer, the resulting polymer has haloalkyleneoxide units bonded at both ends of the polymer. These polymers are difficult to cure. When less than 0.5 mole of the haloalkyleneoxide units is used per mole of liquid living polymer, the number of haloalkyleneoxide units bonded to the liquid living polymer is less than one. The resulting polymers are also difficult to cure. However, when the amount of haloalkyleneoxide employed is within the indicated preferred range, polymers are obtained wherein several molecules of the living polymers are bonded through a haloalkyleneoxide unit to each other. When haloalkyleneoxide units are bonded to the living polymer, the epoxide ring of the haloalkyleneoxide is opened and the resulting oxide associates with the alkali metal cation present in the living polymer to form a functional group abbreviated as —OM, wherein M represents an alkali metal. Therefore, the molecular weight and the number of —OM groups in the product polymer is controlled by maintaining the amount of haloalkyleneoxide units added within the preferred range. The reaction of the liquid living polymer with the haloalkyleneoxide is conducted at −50°~100°C., preferably 0°–80°C., in the same solvent used in the reaction for the polymerization of the living polymer. A satisfactory, purified, reactive conjugated diene polymer can be obtained by precipitating the polymer in the presence of an antioxidant such as di-tert-butyl-p-cresol in accordance with conventional methods.

The reactive conjugated diene polymer consists of modified haloalkyleneoxide units having pendant reactive —OM groups bonded to them between the living polymer units. Since the final product polymer is in a liquid form similar to the living polymer, processing of the polymers is made easier. The product polymer can have —OM groups at the ends of the polymer as well as at points within the chain. Discrimination between these two types of —OM groups is accomplished by referring to the internal groups as pendant —OM groups.

The pendant —OM groups of the conjugated diene polymer can be modified by treating the polymer with a protonic acid to convert it to its polyhydroxy form. The conversion is accomplished by neutralizing the —OM groups with a protonic acid at temperatures lower than 100°C., especially between 0°–25°C. Suitable protonic acids include inorganic acids such as hydrochloric acid, sulfuric acid, phosphoric acid, and organic acids such as acetic acid. The protonic acid is used as an aqueous solution or as a solution of a lower aliphatic alcohol or a mixture thereof. Gaseous acids can also be conveniently used.

The conjugated polymer of this invention is referred to as a "polyhydroxydiene polymer". The uncured, liquid polyhydroxydiene polymers of this invention can be reacted with a saturated polycarboxylic acid to introduce carboxyl groups into the polymer chains. In the reaction with the polymer, the polycarboxylic acid can be used in the form of an acid anhydride; an ester of an alcohol such as methanol, ethanol, allyl alcohol, butanol, benzyl alcohol, 2-cyanoethanol, 2-ethylhexanol, phenol, cyclohexanol, isobutanol, propanol and amyl alcohol; or an acid halide wherein the halide is chloride, bromide or iodide. However, it is preferred to use an acid anhydride. Specific saturated polycarboxylic acids include aliphatic polycarboxylic acids such as succinic acid, glutaric acid, adipic acid, pimeric acid, suberic acid, azelaic acid, sebacic acid, undecanedioic acid and dodecanoic acid; aromatic polycarboxylic acids such as phthalic acid, isophthalic acid, terephthalic acid, pyromellitic acid, and trimellitic acid; and acyclic polycarboxylic acids such as hexahydrophthalic acid, tetrahydrophthalic acid and nadic acid. The amount of the saturated polycarboxylic acid added to the polyhydroxydiene polymers is more than the equivalent amount of the total number of —OM and —OH groups in the polymer. When a dicarboxylic acid is used, more than two equivalents of the acid are required per equivalent of hydroxy groups in the polymer. Quantities of the saturated polycarboxylic acids less than those indicated should not be used because curing of the polyhydroxydiene polymer results. The reaction of the polyhydroxydiene polymer with the saturated polycarboxylic acid can be conducted at temperatures from 0° to 100°C., preferably from 30° to 80°C., in the same solvent used in the synthesis of the living polymer compound. In order to introduce a carboxyl group containing compound into the polyhydroxydiene polymer of this invention, the —OH or —OM groups of the polymer are reacted with the carboxyl group of the saturated polycarboxylic acid to form ester linkages. For example, when phthalic acid is used, polycarboxyl conjugated diene polymers having the groups shown in the following formula are formed:

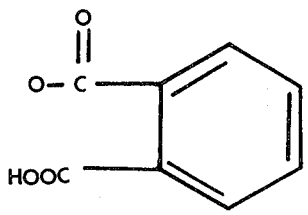

The polycarboxyl conjugated diene polymer (hereinafter referred to as a polycarboxydiene polymer) is a liquid, and can be easily cured by adding a curing agent, such as a polyepoxy compound, a polyisocyanate, which can be the same material used to cure the polyhydroxydiene polymers of this invention; a polyamine such as ethylenediamine, diethylenetriamine, triethylenetetramine, tetraethylenepentamine, phenylenediamine, benzidine, 4,4'-methylene bis (2-chloroaniline); and a polyhydroxyl compound such as trimethylolpropane, pentaerythritol, butyleneglycol, and ethyleneglycol. Curing is accomplished by adding 0.8–1.2 equivalents, preferably 0.8–1.0 equivalents, of the curing agent based on the number of carboxyl groups in the polycarboxydiene polymer, to the polycarboxydiene polymer together with any additives at temperatures from 0° to 200°C., preferably from 20° to 150°C. If quantities of the curing agent greater than the indicated range are used, suitable curing of the polymer is difficult. Since the polycarboxydiene polymer is a liquid, it is very easy to perform casting, injection molding and transfer molding processes during the curing process. The products prepared by this process range from rubber-like elastomers to hard resins.

In summary, the polyhydroxydiene polymers of this invention are liquid polymers containing a certain number of original living polymer units throughout which are dispersed hydrocarbon units having pendant —OH groups attached to them. The number of —OH groups and the molecular weight of the polymer can be controlled by carefully selecting the amount of haloalkyleneoxide to be reacted with the living polymer. The polyhydroxydiene polymer can also be reacted with a saturated polycarboxylic acid to form a liquid polycarboxydiene polymer. Various articles ranging from rubber-like elastomers to hard resins can be produced when the liquid polycarboxydiene polymer is cured with an appropriate curing agent. Because the polyhydroxydiene polymers and the polycarboxydiene polymers are liquids, handling of these polymers in subsequent processes is easy. For example, the polycarboxydiene polymers can be easily cured while processing by pour molding, injection molding or transfer molding techniques even on a large scale. The rubber-like elastomers of this invention possess excellent physical characteristics such as high tensile strengths and good elongation properties which are the same or superior to those of the natural rubbers and synthetic rubbers.

Having now generally described the invention, a further understanding can be attained by reference to certain specific Examples which are provided herein for purposes of illustration only and are not intended to be limiting in any manner unless otherwise specified.

The molecular weight of each living polymer prepared in the process of preparing the polyhydroxydiene polymers of the present invention was simply determined from the ratio of the amount of olefin monomer(s) (molar amounts) used to prepare the living polymer to 0.5 times the molar amount of alkali metal or organo alkali metal catalyst used to prepare the living polymer. The data obtained by this method gave the number average molecular weights of the living polymers which were in close agreement with the average molecular weights of the living polymers. This method is described by M. Szwarc et al in J. Am. Chem. Soc., 79, 2026 (1957). The expression used to determine the average molecular weights of the living polymers is as follows:

$$\bar{M}_w \cong \bar{M}_n = \frac{\text{Monomer}}{0.5 \times \text{catalyst}}$$

EXAMPLE 1

A 0.26 g-atom quantity of lithium metal was reacted with 0.02 mole of purified naphthalene in 100 milliliters of diethyl ether under a purified argon atmosphere. A 0.2 mole quantity of isoprene was added to the reagent and was reacted at −25°C. After completion of the reaction, unreacted lithium metal was filtered. A 10 millimole quantity of the 0.5 N dilithium initiator reagent was added to a flask followed by a small amount of butadiene while under an argon atmosphere to uniformly polymerize it. After the butadiene was polymerized, the diethyl ether was removed under a reduced pressure. To the flask was added 500 milliliters of cyclohexane and 50 g of butadiene, and the butadiene was polymerized. After the polymerization, 15 milliliters of tetrahydrofuran and 0.6 milliliters of epichlorohydrin (0.8 moles per mole of the living polymer) were added and maintained at room temperature overnight while stirring. The resulting white, milk-colored, gel-like reaction product was decomposed by treatment with methanol-hydrochloric acid and isolated by conventional procedures. An analysis of the infrared spectrum confirmed that the polymer contained hydroxyl groups and that the micro-structure contained about 60% diene units. The inherent viscosity (25°C in toluene) of the resulting polymer was 0.37 dl/g. This data indicates that the molecular weight of the polymer treated with epichlorohydrin was three times that of the living polymer which was not treated with epichlorohydrin. This fact shows that the resulting polymer contained two moles of hydroxyl groups per mole of polymer.

EXAMPLE 2

A living polybutadiene was prepared by polymerizing 50 g of butadiene in the presence of 20 millimoles of the dilithium initiator prepared as in Example 1. The living polybutadiene was reacted with 1.56 milliliters of epichlorohydrin (1 mole per mole of living polymer). An analysis of the infrared spectrum confirmed that the resulting polymer contained hydroxyl groups and that the micro-structure contained about 50% diene units. The inherent viscosity of the resulting polymer was 0.34 dl/g, and the molecular weight of the polymer treated with epichlorohydrin was five times that of the living polymer. This fact shows that the resulting polymer contained six moles of hydroxyl groups per mole of polymer.

EXAMPLE 3

The living polymer prepared by a process of Example 2 was reacted with 1.88 milliliters of epichlorohydrin (1.2 moles per mole of living polymer) as revealed in Example 1. An analysis of the infrared spectrum confirmed that the resulting polymer contained hydroxyl groups and that the micro-structure contained about 50% diene units. The inherent viscosity of the resulting polymer was 0.30 dl/g. The molecular weight of the polymer treated with epichlorohydrin was three times that of the untreated living polymer. This fact shows that the resulting polymer contained four moles of hydroxyl groups per mole of polymer.

EXAMPLE 4

An 8 g amount of sodium metal was reacted with 0.1 mole of purified naphthalene in 100 milliliters of tetrahydrofuran under a purified argon atmosphere. After the reaction, the unreacted sodium metal was filtered to obtain a 1.0 N sodium initiator solution. To a flask containing an argon atmosphere was added 40 millimoles of the initiator solution and 50 g of butadiene. After polymerization of the butadiene, 1.8 milliliters of epichlorohydrin (1.2 moles per mole of living polymer) was reacted with the polymer as revealed in Example 1. Analysis of the infrared spectrum confirmed that the resulting polymer contained hydroxyl groups and that the micro-structure contained about 100% vinyl units. The inherent viscosity of the resulting polymer was 0.33 dl/g. The molecular weight of the polymer treated with epichlorohydrin was four times that of the untreated living polymer. This fact shows that the resulting polymer contained five moles of hydroxyl groups per mole of polymer.

EXAMPLE 5

A living polybutadiene polymer having a molecular weight of 2,500 was prepared by polymerizing 25 g of butadiene with the dilithium initiator used in Example 1. The polymer was reacted with 15 millimoles of epichlorohydrin (1.5 moles per mole of living polymer) at room temperature. A 40 millimole quantity of phthalic anhydride in tetrahydrofuran was added to the product and reacted at room temperature for 5 hours while stirring. After the reaction, 0.25 g of 2,6-di-tert-butyl-p-cresol was added and the product was treated with a methanol-hydrochloric acid solution. The product was purified by reprecipitation from a toluene-methanol solution to yield 25 g of polymer. Analysis of the infrared spectrum of the resulting polymer confirmed the presence of associated hydroxyl groups and carbonyl groups. The average molecular weight of the polymer was about 7500 which shows the incorporation of three living polymer molecules per molecule of product polymer. The number of carboxyl groups incorporated in the product is about 3.2 groups per molecule of product polymer. A 5 g quantity of the resulting polymer was admixed with 5 g of an epichlorohydrinbisphenol A epoxy compound manufactured by Shell Col. (Epicoat 828). The resulting transparent mixture was reacted at 120°C in the absence of oxygen for 15 hours to yield a colorless, transparent rubber-like elastomer which had adhesive properties.

EXAMPLE 6

The process of Example 5 was repeated, except that 50 millimoles of succinic anhydride were used instead of 40 millimoles of phthalic anhydride. The resulting polymer had a molecular weight of about 6000 and the number of carboxyl groups per molecule of polymer was about 3.

Having now fully described the invention, it will be apparent to one of ordinary skill in the art that many changes and modifications can be made thereto without departing from the spirit or scope of the invention as set forth herein. Accordingly,

What is claimed as new and intended to be covered by Letters Patent is:

1. A process for preparing a liquid polycarboxydiene polymer, which comprises:
reacting a saturated polycarboxylic acid, anhydride, ester or acid halide with a polyhydroxydiene polymer having pendant and terminal hydroxy goups obtained from the reaction of 1 mole of a living polymer having a molecular weight of 500 to 10,000 which is prepared by reacting a conjugated diolefin or a mixture of the conjugated diolefin and a vinyl compound having the formula:
$CH_2 = CR_1 R_2$
wherein $R_1$ represents a hydrogen atom or an alkyl group and $R_2$ represents an aryl group or a pyridyl group in the presence of sodium or lithium metal or an organo sodium or lithium compound with 0.5 mole to 2 moles of epichlorohydrin, epibromohydrin, epifluorohydrin, chlorobutylene oxide or bromobutylene oxide.

2. The process of claim 1, which further comprises curing said polycarboxydiene polymer with a curing agent selected from the group consisting of a polyepoxy compound, a polyisocyanate, a polyhydroxyl compound and a polyamine.

3. The process of claim 2, wherein said polyhydroxy compound is trimethylolpropane, pentaerythritol, butyleneglycol or ethyleneglycol.

4. The process of claim 2, wherein said polyamine is ethylenediamine, diethylenetriamine, triethylenetetramine, tetraethylenepentamine, phenylenediamine, benzidine or 4,4'-methylene bis (2-chloroaniline).

5. The process of claim 2, wherein said polyisocyanate is toluenediisocyanate, diphenylmethanediisocyanate naphthalenediisocyanate, diphenylsulfonediisocyanate, triphenylmethanetriisocyanate, hexamethylenediisocyanate, diphenylether -4,4'-diisocyanate or xylylenediisocyanate.

6. The process of claim 2, wherein said polycarboxydiene polymer is cured with 0.8–1.2 equivalents of said curing agent based on the number of carboxyl goups in said polycarboxydiene polymer at a temperature from 0° to 200°C.

* * * * *

UNITED STATES PATENT AND TRADEMARK OFFICE
CERTIFICATE OF CORRECTION

PATENT NO. : 3,929,914
DATED : December 30, 1975
INVENTOR(S) : Jihei Inomata, Seiichi Hino and Tatsuo Tani It is certified that error appears in the above-identified patent and that said Letters Patent are hereby corrected as shown below:

Insert --(30) Foreign Application Priority Data

| | | |
|---|---|---|
| 8/17/71 | Japan | 62822/1971 |
| 12/9/71 | Japan | 99643/1971 |
| 12/23/71 | Japan | 104849/1971-- |

Signed and Sealed this thirteenth Day of April 1976

[SEAL]

Attest:

RUTH C. MASON
*Attesting Officer*

C. MARSHALL DANN
*Commissioner of Patents and Trademarks*